United States Patent Office 2,701,630
Patented Feb. 8, 1955

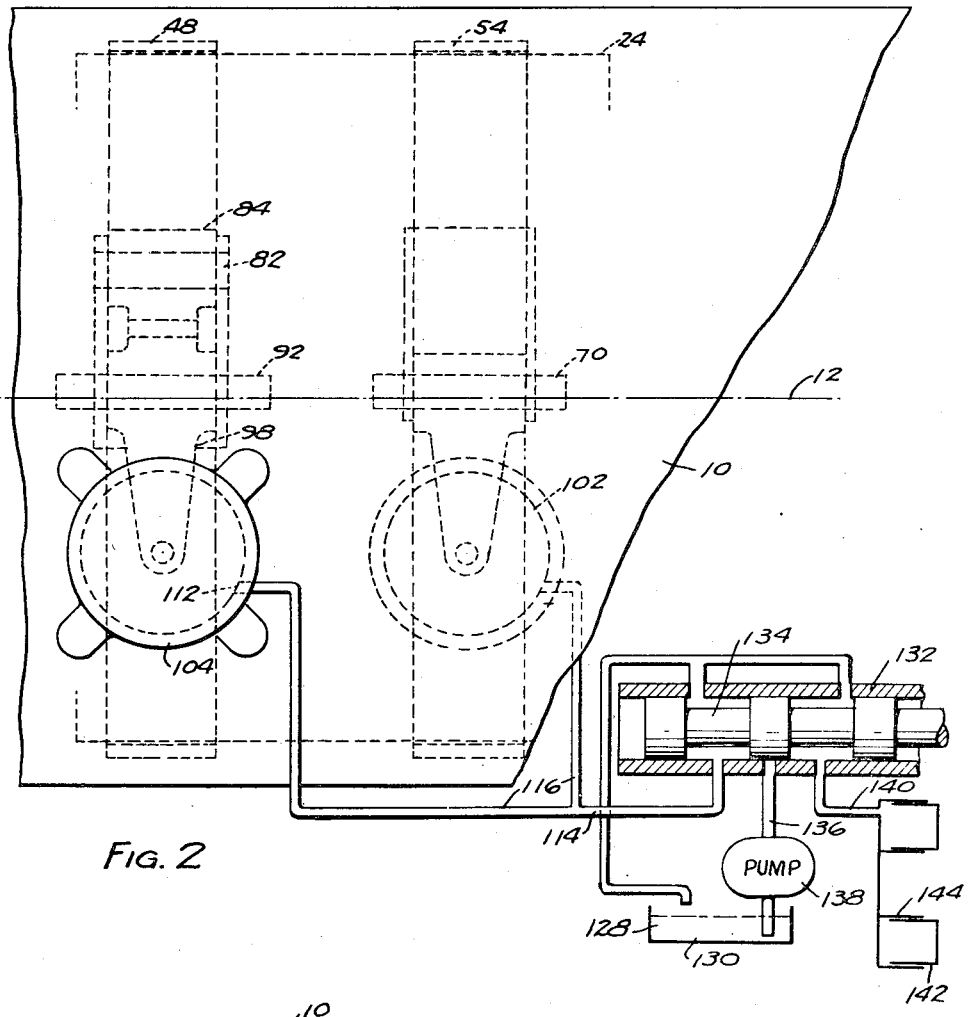

---

2,701,630

MULTIPLE BAND BRAKE FOR TRANSMISSIONS

Winthrop S. Horton, Farmington, and Carroll J. Lucia, Birmingham, Mich., assignors to Studebaker-Packard Corporation, a corporation of Michigan Application September 30, 1953, Serial No. 383,274

12 Claims. (Cl. 188—152)

The present application relates to frictional braking mechanism for controlling a rotatable machine element, and more particularly to an external type dual braking device for a rotating drum or a relatively rotatable cylindrically shaped reaction member in a planetary gear set.

Hitherto known forms of external type braking devices for drums or the like commonly include a plurality of sectors of friction bands and one or more operating mechanisms therefor usually desirably disposed laterally with respect to the center line of the drum. Where possible the band sectors are generally operated so as to be self-energizingly wrapped into the drum in the direction of rotation thereof and a desirable advantage is to be realized if the anchor points for the individual sectors are disposed substantially diametrically opposite to one another and thereby tend to distribute the reaction load so as to give rise to an equalized reaction force couple. The disadvantage of unequal or off-center reaction is that it causes undue and unnecessary radial loads on the drum bearings. The disadvantage of a vertically aligned arrangement as between the band operating mechanism and the drum where the latter forms part of a planetary gear set is that the overall height of the entire planetary unit in such case will be excessive as compared to the previously noted more desirable arrangement wherein the operating mechanism or mechanisms are laterally disposed with respect to the drum and preferably at a common level.

An object of the present invention is a provision of a dual braking device for drums by which the foregoing disadvantages are overcome and in which there are incorporated two laterally disposed operating mechanisms at a common level and each in control of a self-energizing brake band having substantially 360° of wrap and anchoring at a generally diametrically opposed point from the counterpart band. It is to be appreciated that a 360° or full wrapped band has a greater servo or self-energizing capacity than manifested by half bands or partially wrapped bands.

Another object in line with the foregoing objective is to provide an arrangement of a pair of opposite inwardly acting power operator devices for full brake bands to control a rotatable drum, in which the power operator devices are disposed at a common level and in which the brake bands are anchored at opposite sides of the rotatable drum and the proper one of the bands is connected to the power operator device at that side for conjoint movement away therefrom and the other brake band is connected to the corresponding adjacent power operated device for coordinated opposite movement toward said device, resulting in the fact that all bands are wrapped into their frictionally engaged positions in a common direction of rotation of the same sense as the drum's rotation. According to one feature of the present invention the first noted connection is formed by a direct acting connection member between the brake band and its operator device whereas the second named connection which provides for opposite movement as noted is formed by two inter-meshed gear portions which relatively reverse the motion transmitted thereby in order to produce a direction of belt wrap in the sense.

Another object of the invention is to provide an arrangement of laterally disposed fluid motors having self-energized drum-stopping opposite friction bands under their control, in which the motors are separate from one another but simultaneously energized from a common source of pressure so as to cause the friction bands to be applied together and to be mutually self-energizing thereby conjointly stopping the drum from opposite sides thereof.

Another object is to provide, in a laterally disposed motor arrangement simultaneously actuable to brake a drum in the manner set forth in the immediately preceding paragraph, a single support bracket means at each side of the drum and commonly connected to both the actuating and anchored extremities of a single brake band whose opposite ends are at that side, said bracket means also supporting a pivot member through which each bracket means is connected to the actuating extremity of one band. According to a feature of the invention, each bracket means and likewise the anchor point of its brake band are substantially diametrically opposed to their counterparts on the other side of the drum.

Further features, objects, and advantages will either be specifically pointed out or become apparent when for a better understanding of the invention reference is made to the following written description taken in conjunction with the accompanying drawings in which:

Fig. 2 is a side elevation of the case of Fig. 1 but showing an illustrative pressure fluid system for operating the gearing-controlling braking device; and Fig. 3 is a schematic longitudinal section of the planetary gearing along the lines 3—3 of Fig. 1.

Figure 1:
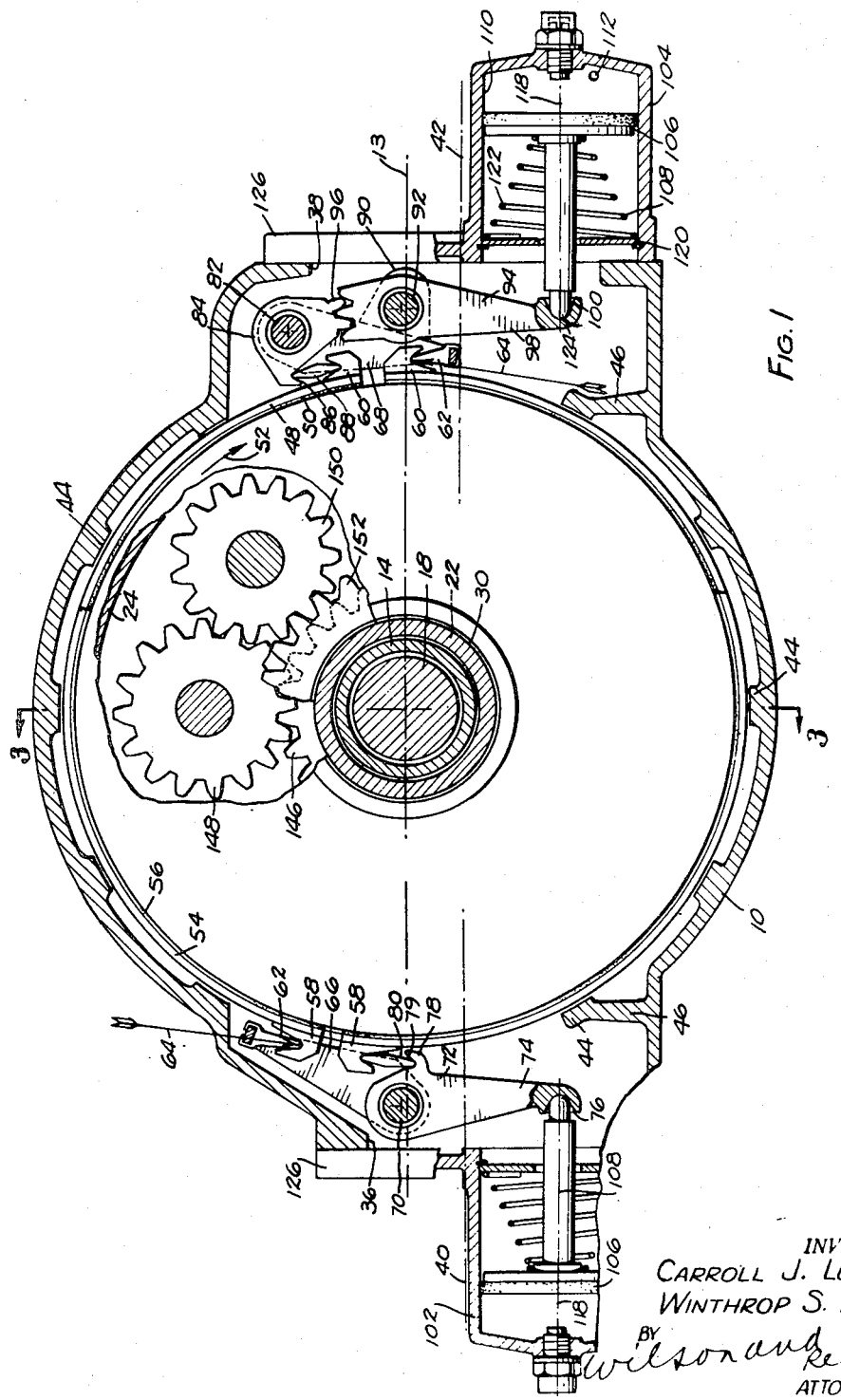
Fig. 1 is a transverse section through a planetary gear type transmission case to which the present dual braking device is shown applied.

In Figs. 1, 2, 3 of the drawings, a transmission case for housing planetary gearing and suitable transmission control mechanism is shown at 10, the case having a central longitudinal axis 12 preferably disposed in a horizontal plane 13, a load connected hollow output shaft 14 axially aligned with the case, and first and second bolted together sections 16, 18 forming a through-type concentric input shaft of which the second or rear section 18 passes freely through the hollow output shaft 14 and similarly thereto, is end connected to a load. The output shafts 14, 18 and the corresponding loads driven thereby which may be constituted by an offset type reduction bull gear and an accessory respectively are more completely shown and described in the co-pending Lucia-Horton application Serial No. 377,418 filed August 31, 1953, the joint inventors herein. A web like radial hub portion for a rotatable clutch housing 20 is seen to be included in the bolted together juncture between the input shaft sections 16, 18 and the housing 20 has an elongated cylindrically formed rear section 22 of reduced diameter which extends into a cylindrical machine element appearing in the form of a smooth brake drum 24. The reduced section 22 of the housing 20 has a rear extremity 26 and also a midportion journaled within a bearing 30 which supports the front one of a pair of tubular spaced apart hubs 32 of different diameters carried by the brake drum. The rear one of the hubs 32 is supported by a bearing 34 for which the hollow output shaft 14 forms the journal support.

The transmission case 10 has a pair of laterally facing openings 36, 38 at the sides thereof which have inwardly directed fastening flanges disposed generally symmetrically about a respective centerline 40, 42 for each side opening. Internally thereof and between the openings, the casing 10 has a plurality of circumferentially spaced apart longitudinal extending raised ribs 44 at least two of which are supported on integral pedestals as at 46, the innersurface of the ribs generally conforming to a cylindrical path of revolution complementary to the external cylindrical surface of the drum 24 but in radially spaced apart relationship with respect thereto. At the relatively forward end of the drum 24 an inner brake band 48 is disposed and will be seen to have an outer metallic backing band within which a wear surface of frictional material as at 50 is attached by rivets, bonding or the like in known manner. The friction surface 50 is adapted to engage the external cylindrical surface of the brake drum 24 for purposes of the showing of Fig. 1 the drum 24 is assumed to have a clockwise direction of rotation according to the arrow 52. A companion brake band 54 similar to the band 48 is disposed toward the rear of the drum 24 such that the planes of the bands are parallel and in closely spaced juxtaposition to one another but mutually perpendicular to the central axis 12. The band 54 has an outer metallic backing strip to the innersurface of which there is affixed a wear surface of friction material 56 by means of bonding, riveting or the like in well known manner. The bands 48, 54 are full bands, that is they each have substantially 360° of wrap, and the opposite ends of each are in closely spaced juxtaposition to one another and each band carries a pair of end lugs 58, 60. The lower one of the lugs 60 and the upper one of the lugs 58 are substantially diametrically opposed to one another with respect to the drum 24 and receive anchor wedges 62 at points which are on opposite sides of the horizontal plane 13 containing the longitudinal central axis 12 for the transmission. The direction of the opposing reaction provided by these anchor points is generally indicated by the arrows 64, Fig. 1, and the reaction is thus in the form of an equalizing force couple for stopping the clockwise rotating drum 24 without imposing an appreciable amount of radial load, if any, on the respective drum bearings 30, 34. The anchor wedges 62 are supported at opposite sides of the drum 24 by a pair of separate single case mounted brackets the relatively rear one of which is shown at 66 and the front one of which is shown at 68. The single rear bracket 66 carries a fixed pivot 70 whose longitudial axis is parallel to but slightly above the horizontal plane 13 and which may extend at one or both of its opposite ends into points of fixed connection with the case 10. Swingably supported on the pivot 70 for oscillatory movement about the longitudinal axis of the latter, there is provided a swingable bell crank member 72 having a depending operating arm 74 which is notched at its actuated end at 76 and having a short arm 78 which is notched at 79 to receive a thrust transmitting link 80 engaging the lower one of the band lugs 58 which serves as the actuating end of the band 54. The opposite single bracket 68 has a horizontally disposed pivot 82 which may extend at one or both of its opposite ends into fixed supported engagement with the case 10. A brake actuating member 84 is pivotally mounted on the pivot 82 for swingable motion about the longitudinal axis of the latter and is notched at 86 to receive a thrust transmitting link 88 engaging the upper one of the band lugs 60 which serves as the actuating end of the near brake band 48.

The aforesaid notches at 86 and 79 are substantially diametrically opposed to one another and are shown on opposite sides of the horizontal plane 13 containing the longitudinal axis 12 of the transmission. The near and far bands 48, 54 are arranged due to the action of thrust through the links 80, 88 to be wrapped in the direction of rotation of the clockwise rotating drum 24 of Fig. 1 and are thus self-energizing in their action for substantially a full 360° of belt wrap.

The single support bracket 68 for the near band 48 has an offset lug 90 to which there is fixedly mounted a pivot 92 having a longitudinal axis parallel to but slightly above the horizontal plane 13 and having if desired one or both of its opposite ends firmly affixed to the sides of the case 10 adjacent the side opening 38 in the latter. A three tooth sector member 94 is swingably mounted on the pivot 92 for oscillatory movement about the longitudinal axis of the latter and the three teeth of the member 94 form a gear sector meshing with a companion set of two teeth 96 forming a gear sector on the previously noted swingable actuating member 84. The pitch diameters of the two sectors are equal to one another and thus there is a 1:1 gear ratio effect between members notwithstanding the fact that there are differing numbers of teeth on the respective three tooth and the two tooth members. The resulting 1:1 gear ratio does serve in effect, however, to provide motion reversal which is of benefit as is hereinafter more fully described. The three tooth member 94 has a depending arm portion 98 provided with an actuated end notched at 100.

As viewed particularly in Fig. 1 it will be noted that the effect of inwardly directed forces on the notched actuating ends 76, 100 of the respective depending arms 74, 98 will cause upward movement of the thrust transmitting link 80 and downward movement of the thrust transmitting link 88, both movements conforming to the general clockwise direction of rotation of the drum 24. The appropriate one of the lugs 58 and 60 for the far and near bands 54, 48 are intentionally wrapped in the direction of rotation of the drum 24 so as to function in a self-energizing fashion in well known manner.

Means associated with the depending arms 74, 98 may be provided for the power actuation thereof. Illustrative of one example of such power actuating means is a pair of pressure actuated laterally disposed fluid motors 102 and 104 which will be seen to be closed at their distal ends. The motors 102, 104 are in the respective planes of the far and near bands 54, 48 and each contains a pressure movable element 106 carrying a power member or rod 108 respectively engaging the notches 76, 100 so as to thrust thereagainst. The pressure movable elements 106 are sealed pistons identical to one another and in the interests of brevity only the element 106 and its associated structure in the motor 104 will be described in particular detail. The motor 104 contains an inner cylindrical working chamber 110 to which pressure fluid is suitably admitted through an opening 112 supplied by a pipe 114 having a pair of split feeder branches 116. The thrust rod 108 reciprocates in a path so as to conform generally to a longitudinal axis 118 which is below the axis of the side opening 42 but in the vertical plane thereof. A fixed plate 120 through which the reciprocating rod passes provides a seat at one end of the working cylinder 110 for a return spring 122 which acts on the pressure movable element 106.

The opposite power thrust members 108 owing to pressure forces in the respective motors 102, 104 are movable relatively inwardly toward the drum 24 and have smooth rounded inner ends as shown at 124 which form ball and socket joints with the respective notches 100, 76 in the arms 74, 98. The motor 104 and similarly the motor 102 are secured as by a plurality of bolts, not shown, at their flanged proximal ends 126 so as to be attached to the attaching flanges surrounding the opposite side openings 38, 36 in the casing 10.

The noted supply pipe 114 having the branches 116 is pressurized by means of a control valve mechanism for hydraulic fluid which may be oil, glycerine or the like and generally contained as at 128 in a reservoir 130. A valve body 132 having a three-spool valve element 134 slidable therein is connected at its midportion to a fluid pipe 136 which receives pressure fluid from a pump 138 leading from the reservoir 130. The valve element 134 is shown in full lines in a neutral or midposition in Fig. 2 and is manually movable from the neutral position into opposite operating positions one of which admits fluid pressure to the pipe 114, thence through the branches 116, and into the opposite motors 102, 104 for simultaneously pressurizing and actuating the same so as to apply the brake bands together. In its opposite or leftward position the valve element 134 is arranged to supply a pipe 140.

Means associated with the rotatable clutch housing 20 may be provided within the casing 10 to connect the input and output shafts 14–18 for mechanical forward and reverse drive. Illustrative of one example of such a forward drive means is a pair of clutch portions 142 and 144 connected to different ones of a respective housing and shaft members 20, 14 and engageable to form a direct 1:1 forward friction drive. The clutch portion 142 is constituted by an annular piston which is received in an annular cylinder or chamber 144 in the clutch housing 20 and filled with pressure fluid by means of the just described pipe 140 connected thereto and under control of the valve element 134. The clutch portion 142, though being axially slidable with respect to the cylinder 144, is non-rotatably held therewithin by means of splines in the clutch housing 20 provided in known manner. The clutch portion 145 comprises a friction disk which at its inner or hub portion is splined to the extreme forward portion of the tubular output shaft 14. Proper movement of the valve 134 to the left causes the cylinder 144 to be pressurized so as to cause mutual engagement between the clutch portions 142, 144 and provide a direct drive between the shafts 16 and 14. Illustrative of one example of a reverse drive means is a dual sun type planetary gear mechanism including a train of gears 146, 148, 150, 152 in constant series mesh to form a reverse reduction gear drive. The first gear 146 of the series is splined to the previously noted rear extremity 26 of the reduced tubular section 22. The relatively small and large gears 146, 152 respectively form the dual suns previously referred to and the relatively short and long pinion gears 148, 150 form the planetary pinions and are enmeshed and rotatably mounted on fixed shafts carried by the rotatable drum 24 for orbital movement about the common longitudinal axis 12. The power path through the planetary gearing just set forth originates at the prime-power-driven input shaft 16 and is conducted from the reduced tubular clutch housing portion 22 through the small sun gear 146 and thence to the short and long continually enmeshed planets 148, 150 to the output sun gear 152 which is splined to the tubular output shaft 14.

Consistent with the clockwise direction of rotation of the drum 24 as assumed for the showing of Fig. 1, the small or input sun gear 146 has a clockwise direction of rotation, the short planet 148 has a counterclockwise direction of rotation in Fig. 1, and the long planet 150 has a clockwise direction of rotation corresponding to that of the input sun 146. The reaction of the load connected to the output shaft 14 and the output sun 152 carried thereby, is such as to tend to make the drum 24 rotate in the assumed clockwise direction of Fig. 1 and accordingly the reaction couple provided by the near and far bands 48 and 54 is necessarily provided in a counterclockwise direction as indicated by the reaction arrows 64. When the friction bands 48, 54 are applied by proper operation, of the valve 134 to the right, the brakes self-energizingly hold the drum against rotation and the resulting movement of the shaft 14 is in a counterclockwise or reverse direction as viewed in Fig. 1.

One example of the tooth numbers contemplated for the respective gears 146, 148, 150 and 152 is 32 teeth, 22 teeth, 20 teeth and 37 teeth in that order, resulting in a reduction ratio over all of 1:1.156 in reverse as when the drum 24 is held fast against rotation. For forward drive the planetary set is locked up by the clutch 142, 145 and a direct 1:1 straight through friction drive results.

It is to be appreciated that the equal and opposite reaction vectors originating at 64 in Fig. 1 will be exact counterbalances to provide the reaction torque necessary to hold fast or else slow down and stop the drum 24 without imparting any appreciable radial loads on the drum bearings 30 and 34. The substantially full 360 degrees of wrap for each of the bands 48, 54 will produce a highly beneficial self-energizing degree of belt wrap demanding only relatively minor thrust from the pressure actuated elements 108, 106. Therefore undue pressures at the hydraulic pump 138 will not be required.

As herein disclosed the present dual brake invention is shown embodied in the environment of a planetary gear case having a rotatable reaction element. It is evident that many applicable features, however, can be used in connection with other forms of rotatable machine elements and indeed many other elements which have to be braked, for instance, wheel brake drums. So also the drawing shows an intermeshed pair of two tooth and three tooth reversing gear sectors generated according to identical pitch diameters but self-evidently the ratio of their pitch diameters for generation purposes may be made different from 1:1 to afford a mechanical advantage of greater or less than 1:1. It is of course understood that the numbers and ratio of teeth on the sectors are not critical so long as there is continuous mesh between sectors. The actuated ends of the near and far bands 48, 54 are shown to be wrapped into the drum 24 in a clockwise direction because of the fact that the drum reaction and tendency of drum rotation is clockwise but indeed the clockwise direction of wrap is not essential to the invention and the direction of wrap may be reversed by simply reversing the location of the actuating mechanism at the opposite sides of the drum whereupon a self-energizing action for braking a counterclockwise direction of rotation for the drum will result. In this latter instance the rotation of the input sun gear 146 and its driving shaft 16 will be counterclockwise as viewed in Fig. 1.

Variations within the spirit and scope of the invention described are equally comprehended by the foregoing description.

What is claimed is:

1. In a braking mechanism, a casing having laterally facing openings at a common level on opposite sides thereof, a drum mounted for rotation in said casing between the openings about an axis slightly above the mid level of the openings, separate fluid motor cylinders closed at their distal ends and detachably covering the openings at their proximal ends, pressure movable members within the motor cylinders and energizable to move toward said drum from opposite sides, a pair of axially spaced apart contractible bands each substantially surrounding said drum and having its opposite ends disposed adjacent each other, wear surface means between the drum and the the bands and affixed to the latter, means for anchoring one end of the respective bands at points substantially diametrically opposite to one another and on opposite sides of a horizontal plane containing said drum axis, pivoted members notched to receive thrust transmitting links for moving the other end of the bands to bring the wear surface means into frictional engagement with said drum, said notches being arranged at points substantially diametrically opposite to one another and on opposite sides of the horizontal plane containing said drum axis, the pressure movable and pivoted members at one side of the drum being directly connected to one another, and motion reversing means including meshed gear sectors for connecting the opposite pressure movable member and the pivoted member at that side.

2. In a braking mechanism, a casing having laterally facing openings at a common level on opposite sides, a drum mounted for rotation in said casing between the openings about an axis slightly above the mean level of the openings, separate fluid motor cylinders closed at their distal ends and detachably covering the openings at their proximal ends, pressure movable members within the motor cylinders and energizable to move toward said drum from opposite sides, a pair of axially spaced apart contractible bands each substantially surrounding said drum and having its opposite ends disposed adjacent each other, wear surface means between the drum and the bands and affixed to the latter, means for anchoring one end of the respective bands at points substantially diametrically opposite to one another and on opposite sides of a horizontal plane containing said drum axis, pivoted members notched to receive thrust transmitting links for bringing the band ends relatively together to contract said bands and thereby cause said wear surface means frictionally to engage said drum, said notches being arranged at points substantially diametrically opposite to one another and the pressure movable and pivoted members at one side of the drum being directly connected to one another, and motion reversing means including meshed gear sectors for connecting the opposite pressure movable member and the pivoted member at that side.

3. In a braking mechanism, a casing having laterally facing openings at a common level at opposite sides, a drum mounted for rotation in said casing between the openings about an axis slightly vertically displaced with respect to the mean level of the openings, separate fluid motor cylinders closed at their distal ends and detachably covering the openings at their proximal ends, pressure movable elements within the motor cylinders and energizable to move toward said drum from opposite sides, a pair of contractible bands substantially surrounding said drum in different planes and each having its opposite ends disposed adjacent one another, wear surface means between the drum and the bands and affixed to the latter, means for anchoring one end of the respective bands at points substantially diametrically opposite to one another pivoted elements notched to receive thrust transmitting links for bringing the band ends relatively together to contract said bands and thereby cause said wear surface means frictionally to engage said drum, said notches being arranged at points substantially diametrically opposite to one another and said pressure movable and pivoted elements at one side of the drum being directly connected to one another, and motion reversing means including a sector portion connected to each of the other pressure movable and pivoted elements and cooperating to establish coordinated movement of the same in opposite directions.

4. In a braking mechanism, a casing having laterally facing openings at a common level on opposite sides thereof, a machine element mounted for rotation in said casing between the openings about a horizontal axis slightly vertically displaced with respect to the level of the openings, separate fluid motor cylinders closed at their distal ends and detachably covering the openings at their proximal ends, pressure movable members within the motor cylinders and energizable to move toward said machine element from opposite sides, a pair of contractible bands substantially surrounding said drum in different planes and each having its opposite ends disposed adjacent one another, wear surface means between the drum and the bands and affixed to the latter, means for anchoring one end of the respective bands at points substantially diametrically opposite to one another and on opposite sides of a horizontal plane containing said axis of rotation, pivoted members notched to receive thrust transmitting links for moving the other end of the bands to bring the wear surface means into the frictional engagement with said machine element, said notches being arranged at points substantially diametrically opposite to one another and on opposite sides of the aforesaid horizontal plane containing said axis of rotation, the pressure movable and pivoted members at one side of the machine element being directly connected to one another, and motion reversing means for mechanically connecting the pressure movable member at the opposite side and the pivoted member at that side.

5. In a set of planetary gearing, a casing having laterally facing openings at a common level on the opposite sides thereof, a cylindrical reaction member for the gearing mounted for rotation in said casing between the openings about a horizontal axis slightly above the mean level of the openings, separate fluid motor cylinders closed at their distal ends and detachably covering the openings at their proximal ends, pressure movable members within the motor cylinders and energizable to move toward said reaction member from opposite sides, a pair of contractible bands substantially surrounding said drum in separate closely spaced planes and each having its opposite ends disposed adjacent one another, wear surface means between the drum and the bands and affixed to the latter, means for anchoring one end of the respective bands at points substantially diametrically opposite to one another and on oppositte sides of a horizontal plane containing the aforesaid axis of rotation, pivoted members of a number corresponding to said bands with one member disposed adjacent each band and having link receiving notches, thrust links disposed between and engaging the notch of each band and its adjacent pivoted member for bringing the band ends relatively together to contract the bands and thereby cause said wear surface means frictionally to engage said reaction member, said notches being arranged at points substantially diametrically opposite to one another and on opposite sides of the horizontal plane containing the aforesaid axis of rotation, the pressure movable and pivoted members at one side of the reaction member being directly connected to one another, and motion reversing means including enmeshed gear sectors for connecting the opposite pressure movable member and the pivoted member at that side.

6. For use in a casing having a longitudinal axis, an element mounted therein for rotation about said axis and having a generally cylindrical external surface, means forming openings at opposite sides of said casing, a pressure actuated device at each side of the casing having a brake controlling member movable thereby inwardly in line with the opening at that side, a full brake band controlled by each device and disposed so as to encircle the aforesaid external surface of the rotatable element in a manner such that the opposite ends of each band are at a different side of the casing from the ends of the other band and are generally adjacent the opening at that side, said bands being axially spaced apart from one another, and means for bringing the band ends relatively together so as to wrap the bands into the rotatable element in the direction of rotation thereof including a swingable operating member for moving one end of each band, support means common to the other end of each band and its operating member, one said operating member being directly connected to one controlling member, and motion reversing means interconnecting the other operating member and the other controlling member.

7. For use in a casing having a longitudinal axis, a member mounted therein for rotation about said axis and having a generally cylindrical external surface, a pressure actuated device on each side of the casing having a brake controlling element movable thereby inwardly in the direction of said rotatable member, a full brake band controlled by each device and formed and arranged to encircle the aforesaid external surface of the rotatable member in a manner such that the opposite ends of each band are at a different side of the casing from the ends of the other band and such that the bands are in different spaced apart planes from one another, means for bringing the band ends relatively together so as to wrap the bands into the rotatable member in the direction of rotation thereof including a swingable operating element for moving one end of each band, support means common to the other end of each band and its operating element, one said operating element being directly connected to one controlling element, and motion reversing means interconnecting the other operating and controlling elements.

8. For use in a casing having a longitudinal axis, a member supported for rotation therein about said axis and having a generally cylindrical external surface, means forming openings at opposite sides of said casing, a pressure actuated device at each side of the casing having a brake controlling element movable thereby inwardly through the opening at that side, a full brake band controlled by each device and formed and arranged to encircle the aforesaid external surface of the rotatable member in a manner such that the opposite ends of each band are at a different side of the casing from the ends of the other band and are generally adjacent the opening at that side, said bands being disposed in different planes from one another, and means for bringing the band ends relatively together so as to wrap the bands into the rotatable member in the direction of rotation thereof including a swingable operating element for moving one end of each band, support means common to the other end of each band and its operating element, there being a direct connection between one of said controlling and operating members, and motion reverse means interconnecting the other of the operating and controlling members.

9. For use in a casing having a longitudinal axis, a member mounted therein for rotation about said axis and having a generally cylindrical external surface, similar separate pressure actuated devices at opposite sides of the casing, a full brake band controlled by each device and formed and arranged to encircle the aforesaid external surface of the rotatable member in a manner such that the opposite ends of each band are at a different side of the casing from the ends of the other band and the plane of each band is axially spaced apart from the plane of the other band, there being a swingable operating element at each side of the rotatable member for moving one of the band ends at that side, a support bracket common to each operating element and to the adjacent other band end, the brackets being diametrically opposite to one another with respect to the cylindrical surface, and an interchangeable pressure movable element included in the pressure actuated device at each side of said rotatable member below a horizontal plane containing the axis thereof and having a connection to the operating element at that side different from the connection between the other interchangeable pressure movable element and the other operating element, one said connection between elements comprising a toothed portion formed on each element and intermeshing to provide for motion reversal therebetween.

10. For use in a casing having a longitudinal axis, a member mounted therein for rotation about said axis and having a generally cylindrical external surface, separate pressure actuated devices at opposite sides of the casing, a full brake band controlled by each device and formed and arranged to encircle the aforesaid external surface of the rotatable member in a manner such that the opposite ends of each band are at a different side of the casing from the ends of the other band and the plane of each band is axially spaced apart from the plane of the other band, there being a swingable operating element at each side of the rotatable member for moving one of the band ends at that side, a support bracket common to each operating element and to the adjacent other band end, the brackets being diametrically opposite to one another with respect to the cylindrical surface, and a pressure movable element included in the pressure actuated device at each side of said element below a horizontal plane containing the axis thereof and having a connection to the operating element at that side different from the connection between the other pressure movable element and the other operating element, one said connection between elements comprising a toothed portion formed on each element and mutually enmeshed to provide for motion reversal therebetween, and means common to said pressure actuated devices through which pressure fluid may be simultaneously introduced for conjointly actuating the pressure movable elements thereof.

11. In an external brake arrangement for controlling a reaction drum forming part of a planetary gear system, a band type first friction means wrapped substantially completely about the circumference of the drum, a band type second friction means wrapped substantially completely about the circumference of the drum, said first and second friction means being axially separated such that their planes are in closely spaced juxtaposition and each having one of its adjacent opposite ends anchored and the other movably actuatable to contract the same, a single swingable member connected to said other end of the first friction means for actuating the same and having a depending arm, a pair of swingable members establishing toothed cooperation with one another with one member being connected to the other end of the second friction means and the other member having a depending arm, a support bracket commonly supporting said single swingable member and said anchored end of the first friction means at one side of the drum, a support bracket commonly supporting said pair of swingable members and said anchored end of the second friction means at the diametrically opposite side of the drum, and separate simultaneously operable means arranged laterally of the drum and having inwardly directed power elements disposed one at each side thereof and engageable with the depending arm at that side to actuate the first and second friction means and contract the same.

12. In an external brake arrangement for controlling a rotatable machine element, a band type first friction means wrapped in a first plane substantially completely about the circumference of the machine element, a band type second friction means wrapped in a second plane substantially completely about the circumference of the machine element, each of said friction means having one of its adjacent opposite ends anchored and the other movably actuatable to contract the same in its corresponding plane, a single swingable member connected to said other end of the first friction means for actuating the same and having a depending arm, a pair of swingable members establishing toothed cooperation with one another with one member being connected to the other said end of the second friction means and the other member having a depending arm, support means commonly supporting said swingable member and said anchored end of said first friction means on one side of the machine element, support means commonly supporting said pair of swingable members and said anchored end of the second friction means at the diametrical side of said machine element, and means including inwardly directed power elements disposed one at each side of the machine element and engageable with the depending arm at that side to actuate the corresponding friction means and contract the same in its plane.

References Cited in the file of this patent

UNITED STATES PATENTS

| | | |
|---|---|---|
| 2,068,776 | Syrovy | Jan. 26, 1937 |
| 2,098,125 | Yoxall | Nov. 2, 1937 |
| 2,633,760 | Kelley | Apr. 7, 1953 |

FOREIGN PATENTS

| | | |
|---|---|---|
| 792,198 | France | Oct. 14, 1935 |